United States Patent
Hoshiyama et al.

(10) Patent No.: US 8,881,716 B2
(45) Date of Patent: Nov. 11, 2014

(54) WIRE SAW WITH TENSION DETECTING MEANS AND GUIDE ROLLER SPEED CONTROL

(75) Inventors: Toyohiro Hoshiyama, Hiroshima (JP); Shoji Imakurusu, Hiroshima (JP); Hiroyuki Yoshimura, Hiroshima (JP); Tatsumi Hamasaki, Hiroshima (JP)

(73) Assignee: Toyo Advanced Technologies Co., Ltd., Hiroshima-shi, Hiroshima (JP)

( * ) Notice: Subject to any disclaimer, the term of this patent is extended or adjusted under 35 U.S.C. 154(b) by 253 days.

(21) Appl. No.: 13/577,051

(22) PCT Filed: Feb. 8, 2010

(86) PCT No.: PCT/JP2010/000752
§ 371 (c)(1),
(2), (4) Date: Aug. 3, 2012

(87) PCT Pub. No.: WO2011/096019
PCT Pub. Date: Aug. 11, 2011

(65) Prior Publication Data
US 2012/0298091 A1 Nov. 29, 2012

(51) Int. Cl.
*B23D 57/00* (2006.01)
*B24B 27/06* (2006.01)
*B28D 5/04* (2006.01)

(52) U.S. Cl.
CPC ......... *B23B 57/0069* (2013.01); *B24B 27/0633* (2013.01); *B28D 5/045* (2013.01)
USPC ........... 125/16.02; 125/21; 451/168; 451/296

(58) Field of Classification Search
CPC .. B23D 57/0069; B23D 57/003; B28D 5/045; B28D 5/042; B24B 27/0633
USPC ............... 451/168, 296, 302; 125/12, 16.01, 125/16.02, 21
See application file for complete search history.

(56) References Cited

U.S. PATENT DOCUMENTS 3,888,050 A * 6/1975 Elm .............................. 451/57
4,145,846 A * 3/1979 Howland et al. .................. 451/5
(Continued)

FOREIGN PATENT DOCUMENTS

JP 4-75862 3/1992
JP 04075862 A * 3/1992
(Continued)

*Primary Examiner* — Lee D Wilson
*Assistant Examiner* — Tyrone V Hall, Jr.
(74) *Attorney, Agent, or Firm* — Gerald E. Hespos; Michael J. Porco; Matthew T. Hespos

(57) ABSTRACT

The present invention provides a wire saw which cuts a workpiece using a cutting wire and is capable of adjusting wire tension with high responsiveness. The wire saw includes first and second workpiece cutting units 1A and 1B. Each of the workpiece cutting units 1A and 1B includes a pair of guide rollers 10*a* and 10*b* around which a wire W is wound to form a workpiece-cutting wire group. The wire saw further includes a tension detector 18 which detects tension in the wire W between the workpiece cutting units 1A and 1B, and a control device 50. The control device 50 changes a rotational speed of the guide rollers 10*a* and 10*b* of at least one of the workpiece cutting units based on the tension detected by the tension detector 18 so as to keep the tension within an acceptable range.

3 Claims, 4 Drawing Sheets

(56) References Cited

U.S. PATENT DOCUMENTS

| | | | |
|---|---|---|---|
| 4,596,640 A * | 6/1986 | Inoue | 205/662 |
| 4,655,191 A * | 4/1987 | Wells et al. | 125/16.01 |
| 5,201,305 A * | 4/1993 | Takeuchi | 125/21 |
| 5,564,409 A * | 10/1996 | Bonzo et al. | 125/12 |
| 5,628,301 A * | 5/1997 | Katamachi | 125/21 |
| 5,699,782 A * | 12/1997 | Toyama | 125/21 |
| 5,829,424 A * | 11/1998 | Hauser | 125/16.01 |
| 5,865,162 A * | 2/1999 | Kambe et al. | 125/16.02 |
| 5,944,007 A * | 8/1999 | Miyoshi et al. | 125/13.01 |
| 6,024,319 A * | 2/2000 | Kawabata et al. | 242/417.3 |
| 6,178,962 B1 * | 1/2001 | Ohashi et al. | 125/16.01 |
| 6,401,333 B1 * | 6/2002 | Suzuki et al. | 29/848 |
| 6,443,143 B1 * | 9/2002 | Ishida et al. | 125/16.02 |
| 6,941,940 B1 * | 9/2005 | Zavattari et al. | 125/16.02 |
| 6,945,242 B2 * | 9/2005 | Kondo et al. | 125/21 |
| 7,926,478 B2 * | 4/2011 | Nakai et al. | 125/16.02 |
| 2002/0100469 A1 * | 8/2002 | Shimazaki et al. | 125/21 |
| 2002/0115390 A1 * | 8/2002 | Kondo et al. | 451/49 |
| 2004/0255924 A1 * | 12/2004 | Kondo et al. | 125/41 |
| 2006/0258268 A1 * | 11/2006 | Miyata et al. | 451/41 |
| 2007/0023027 A1 * | 2/2007 | Nakai et al. | 125/21 |

FOREIGN PATENT DOCUMENTS

| | | | |
|---|---|---|---|
| JP | 9-70821 | | 3/1997 |
| JP | 2000-61805 | | 2/2000 |
| JP | 2001232550 | | 8/2001 |
| JP | 2005-186202 | | 7/2005 |
| JP | 2005186202 A | * | 7/2005 |
| JP | 2009-274167 | | 11/2009 |
| JP | 2009274167 A | * | 11/2009 |

\* cited by examiner

WIRE SAW WITH TENSION DETECTING MEANS AND GUIDE ROLLER SPEED CONTROL

TECHNICAL FIELD

The present invention relates to a wire saw adapted to cut a workpiece such as a semiconductor ingot by use of a cutting wire.

BACKGROUND ART

Conventionally, a wire saw is known as means for cutting a workpiece such as a semiconductor ingot into slices. The wire saw comprises a plurality of guide rollers, a motor that rotationally drives the guide rollers, and the like, wherein a cutting wire is wound between the guide rollers to form a wire group in which a large number of the cutting wires are arranged. With this wire saw, a workpiece is cutting-fed in a direction perpendicular to the wire axial direction with respect to the wire group formed by the wire which is run at high speed in an axial direction, thereby being cut into a large number of wafers at the same time.

For example, the wire saw described in Japanese Patent Application Laid-open No. 2000-61805 is known as a wire saw of this type. The wire saw described in Japanese Patent Application Laid-open No. 2000-61805 comprises a first workpiece cutting unit and a second workpiece cutting unit (main roll units) each having a plurality of guide rollers, and a pair of wire feeder/winders, wherein a single cutting wire fed from one of the wire feeder/winders is passed around and stretched between guide rollers of each workpiece cutting unit and wound by the other wire feeder/winder. A wire group for cutting a workpiece is thus formed in each of the workpiece cutting units.

Generally, as to a wire saw, it is important to maintain tension in a cutting wire at an appropriate level. However, with a wire saw including two workpiece cutting units such as that described in Japanese Patent Application Laid-open No. 2000-61805, an effect of a cutting operation by a workpiece cutting unit on an upstream side of a wire running direction of the wire saw causes a fluctuation in tension in a cutting wire introduced into a workpiece cutting unit on a downstream side of the wire running direction.

As means for suppressing the fluctuation in tension, Japanese Patent Application Laid-open No. 2000-61805 discloses a tension detector that detects tension in a cutting wire between both workpiece cutting units and a tension adjustment mechanism that controls the tension based on a value detected by the tension detector. The tension adjustment mechanism includes a pair of dancer rollers across which the cutting wire is passed around and stretched and an arm which is pressed against the cutting wire between the dancer rollers to thereby vary the tension in the cutting wire, being operated so as to maintain tension in a wire introduced into a downstream-side workpiece cutting unit at an appropriate level.

However, in this wire saw, the tension adjustment mechanism is activated only upon fluctuation in the cutting wire tension detected by the tension detector fluctuates, thus hardly obtaining high responsiveness.

SUMMARY OF THE INVENTION

An object of the present invention is to provide a wire saw which comprises a first workpiece cutting unit and a second workpiece cutting unit and which is capable of adjusting tension in a cutting wire between both workpiece cutting units to an appropriate level with high responsiveness. A wire saw according to the present invention comprises: a wire feeder that feeds a cutting wire; a first workpiece cutting unit including a plurality of first guide rollers and a first drive unit that rotationally drives the first guide rollers, the cutting wire fed from the wire feeder being wound around each of the first guide rollers to form a workpiece-cutting wire group; a second workpiece cutting unit including a plurality of second guide rollers and a second drive unit that rotationally drives the second guide rollers, the cutting wire led out from the first workpiece cutting unit being wound around each of the second guide rollers to form a workpiece-cutting wire group; a wire winder that winds the cutting wire led out from the second workpiece cutting unit; a tension detector that detects tension in the cutting wire between the first workpiece cutting unit and the second workpiece cutting unit; and a control device that adjusts respective rotational speeds of the first guide rollers and the second guide rollers driven by the first drive unit and the second drive unit respectively. The control device changes at least one of the rotational speeds of the first guide rollers and the second guide rollers so as to keep the tension detected by the tension detector within a predetermined range.

BEST MODE FOR CARRYING OUT THE INVENTION

A preferred embodiment of the present invention will now be described with reference to the drawings.

Figure 1:
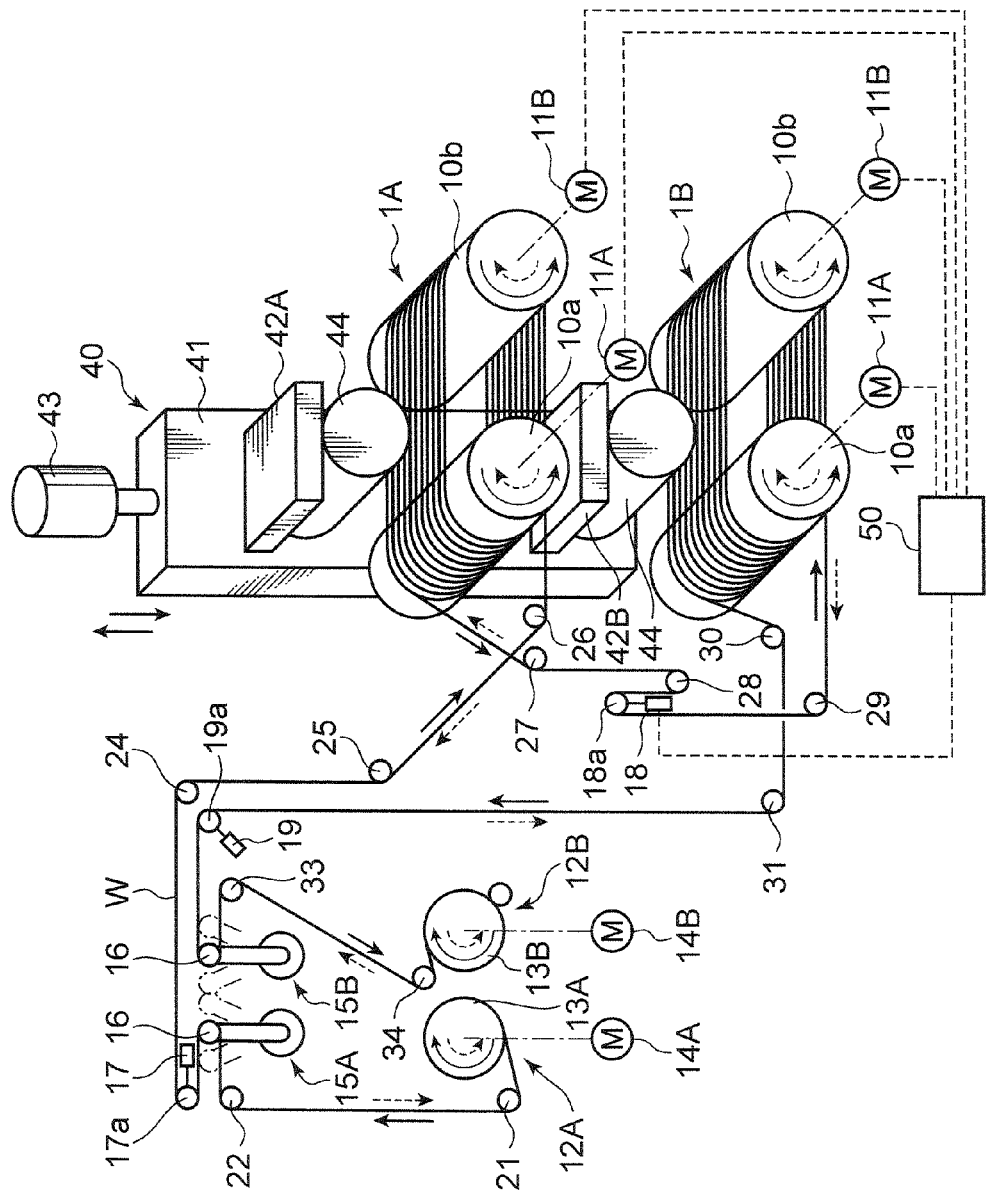
FIG. 1 is a schematic view showing an overall configuration of a wire saw according to an embodiment of the present invention.

FIG. 1 schematically shows an entirety of a wire saw according to the present embodiment. The wire saw comprises upper and lower workpiece cutting units 1A and 1B, a pair of wire feeder/winders 12A and 12B, wire tension adjusters 15A and 15B each having a pulley 16, tension detectors 17 to 19 having respective pulleys 17a, 18a, and 19a, guide pulleys 21 to 34, and the like.

The workpiece cutting unit 1A includes a pair of guide rollers 10a and 10b aligned horizontally and motors 11A and 11B adapted to rotationally drive the guide rollers 10a and 10b, respectively. Similarly, the workpiece cutting unit 1B includes a pair of guide rollers 10a and 10b aligned horizontally and motors 11A and 11B adapted to rotationally drive the guide rollers 10a and 10b, respectively. Alignment directions (the horizontal direction in the drawing) of the guide rollers 10a and 10b in the respective workpiece cutting units 1A and 1B are parallel to each other, and both workpiece cutting units 1A and 1B are aligned in a direction perpendicular to the alignment directions of the guide rollers 10a and 10b (the vertical direction in the same drawing).

Each of the wire feeder/winders 12A and 12B (to be referred to as a first wire feeder/winder 12A and a second wire feeder/winder 12B when appropriate) includes bobbins 13A and 13B around which a cutting wire W is wound, and bobbin drive motors 14A and 14B adapted to rotationally drive the bobbins 13A and 13B, respectively.

The wire W fed from the bobbin 13A of one of the wire feeder/winders 12A is:

(1) sequentially passed around the guide pulleys 21 and 22, the pulley 16 of the wire tension adjuster 15A, the pulley 17a of the tension detector 17, and the guide pulleys 24 to 26, in this order,
(2) helically wound a large number of times between the guide rollers 10a and 10b of the workpiece cutting unit 1A while being fitted into guide grooves (not shown) on outer circumferential surfaces of the guide rollers 10a and 10b, in this order,
(3) sequentially passed around the guide pulleys 27 and 28, the pulley 18a of the tension detector 18, and the guide pulley 29, in this order,
(4) helically wound a large number of times between the guide rollers 10a and 10b of the workpiece cutting unit 1B while being fitted into guide grooves (not shown) on outer circumferential surfaces of the guide rollers 10a and 10b, in this order,
(5) sequentially passed around the guide pulleys 30 and 31, the pulley 19a of the tension detector 19, the pulley 16 of the wire tension adjuster 15B, and the guide pulleys 33 and 34, in this order, and
(6) wound by the bobbin 13B of the other wire feeder/winder 12B.

The wire tension adjusters 15A and 15B apply predetermined tension to the wire W passed around the pulley 16.

In the present embodiment, a rotational driving direction of the guide roller 10a by the respective drive motors 11A and 11B of the workpiece cutting units 1A and 1B and a rotational driving direction of the bobbins 13A and 13B by the respective bobbin drive motors 14A and 14B can be switched between forward and reverse. Due to the switching, as indicated by solid line arrows in FIG. 1, drive conditions of the wire W are switched between a condition in which the wire W is fed from the bobbin 13A of the first wire feeder/winder 12A and wound by the bobbin 13B of the second wire feeder/winder 12B (hereinafter referred to as a "first running condition") and a condition in which the wire W is fed from the bobbin 13B of the second wire feeder/winder 12B and wound by the bobbin 13A of the first wire feeder/winder 12A (hereinafter referred to as a "second running condition"). In these running conditions, a large number of wires W (to be referred to as a wire group when appropriate) are stretched parallel to each other between the guide rollers 10a and 10b of the workpiece cutting units 1A and 1B, and the wire group is reciprocally driven at high speed in an axial direction thereof.

Therefore, both wire feeder/winders 12A and 12B according to the present embodiment double as a "wire feeder" and a "wire winder" according to the present invention, and both workpiece cutting units 1A and 1B according to the present embodiment double as a "first workpiece cutting unit" and a "second workpiece cutting unit" according to the present invention. Specifically, in the first running condition, the wire feeder/winder 12A functions as a "wire feeder" according to the present invention, the wire feeder/winder 12B functions as a "wire winder" according to the present invention, the workpiece cutting unit 1A functions as a "first workpiece cutting unit" according to the present invention, and the workpiece cutting unit 1B functions as a "second workpiece cutting unit" according to the present invention. Conversely, in the second running condition, the wire feeder/winder 12B functions as a "wire feeder" according to the present invention, the wire feeder/winder 12A functions as a "wire winder" according to the present invention, the workpiece cutting unit 1B functions as a "first workpiece cutting unit" according to the present invention, and the workpiece cutting unit 1A functions as a "second workpiece cutting unit" according to the present invention.

The present invention is not limited to a configuration in which the driving direction of the wire W is switchable between forward and reverse as described above but may also include a configuration in which the wire is only driven in one direction. In such a case, a workpiece cutting unit on an upstream side of the running direction of the wire W corresponds to a "first workpiece cutting unit" and a workpiece cutting unit on a downstream side of the running direction of the wire W corresponds to a "second workpiece cutting unit".

To the side of the workpiece cutting units 1A and 1B is provided a workpiece feeder 40 for moving a cylindrical workpiece 44 (for example, an ingot). The workpiece feeder 40 includes a vertical table 41 approximately shaped in a cuboid and vertically extending, a pair of upper and lower workpiece holding units 42A and 42B, and a workpiece feeding motor 43.

The workpiece holding units 42A and 42B are vertically aligned in a single row and protrude toward positions above the respective workpiece cutting units 1A and 1B from one side surface of the vertical surface table 41, holding workpieces 44 via a slice base (not shown), respectively. An orientation of the held workpieces 44 is set, based on a crystal axis thereof, to an orientation which provides a desired crystal orientation. The upper workpiece holding unit 42A (a first workpiece holding unit 42A) holds the workpiece 44 above an upper wire group among the wire groups formed between the guide rollers 10a and 10b of the first workpiece cutting unit 1A, and the lower workpiece holding unit 42B, interposed between the first workpiece cutting unit 1A and an upper wire group formed between the guide rollers 10a and 10b of the second workpiece cutting unit 1B, holds the workpiece 44 above the upper wire group.

In cooperation with a ball screw (not shown), the workpiece feeding motor 43 integrally raises and lowers the vertical surface table 41, both workpiece holding units 42A and 42B and further the workpieces 44 held by the workpiece holding units 42A and 42B respectively.

In other words, with this wire saw, a cutting region is defined between the guide rollers 10a and 10b of the respective workpiece cutting units 1A and 1B, and, while wire groups formed in the cutting region are simultaneously driven at high speed in a longitudinal direction thereof, the workpiece feeder 40 simultaneously cutting-feeds workpieces 44 held by the respective workpiece holding units 42A and 42B toward the wire groups in the cutting region in a same direction from outside to inside (in the drawing, from an upper side to a lower side) of the wire groups wound around the guide rollers 10a and 10b. In this way, a large number of wafers (thin sections) are simultaneously cut from each workpiece 44.

The wire saw further includes a controller 50 that performs a centralized control of a cutting operation of the workpiece 44. The controller 50 activates the respective bobbin drive motors 14A and 14B of the respective wire feeder/winders 12A and 12B to drive the wire W at high speed in a predetermined direction, and adjusts driving speeds of the wire tension adjusters 15A and 15B, based on tension in the wire W detected by the tension detectors 17 and 19, to thereby control the tension in the wire W. In addition, the controller 50 also functions as a "control device" according to the present invention, adapted to adjust rotational driving speeds of the guide rollers 10a and 10b of the respective workpiece cutting units 1A and 1B, based on a detected value by the tension detector 18 (which corresponds to a tension detector according to the present invention) provided between both workpiece cutting units 1A and 1B, to control tension in the wire W guided from one of the workpiece cutting units 1A and 1B to the other so as to keep the tension within an appropriate range.

Figure 2:
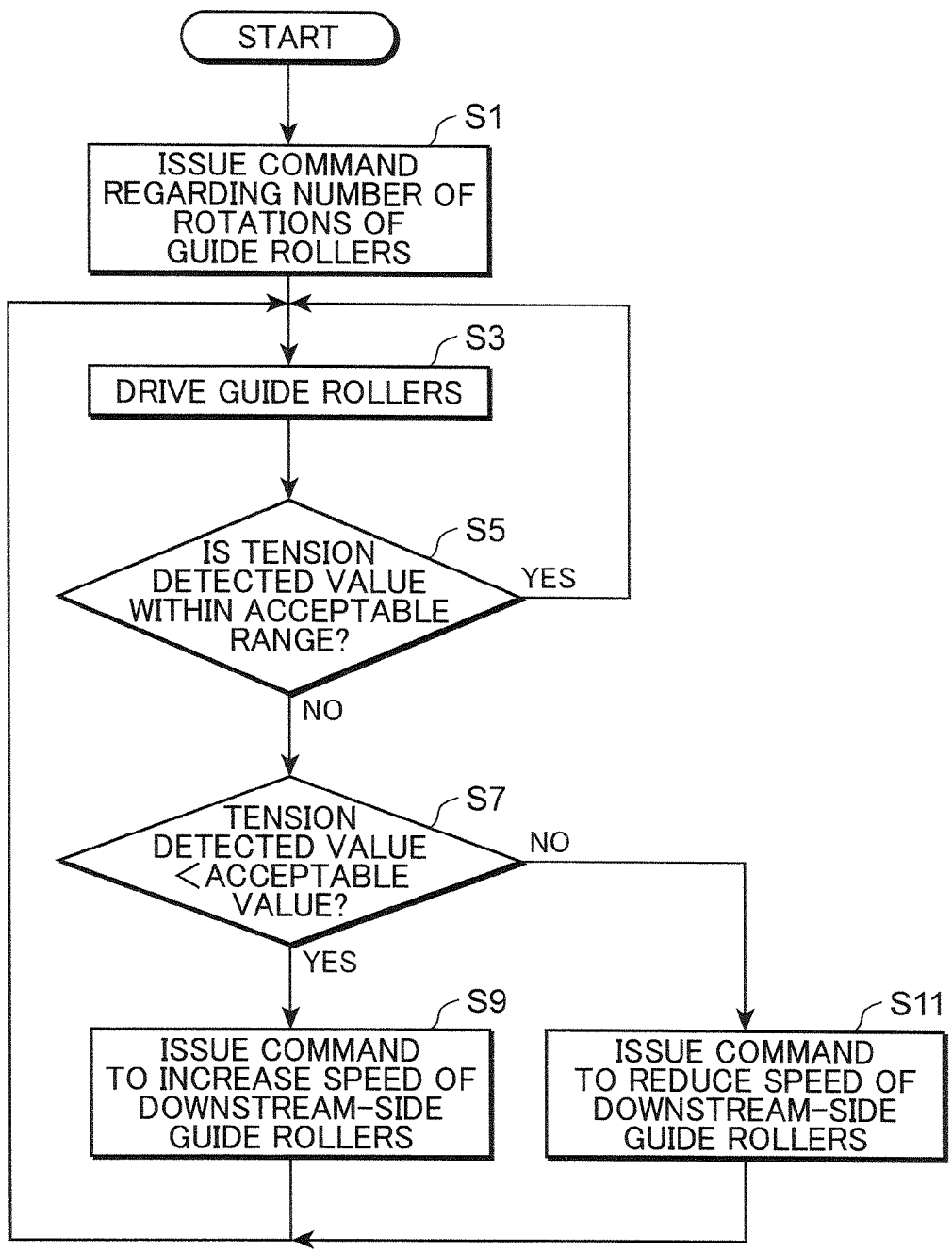
FIG. 2 is a flow chart showing an example of control of tension in a cutting wire between a first workpiece cutting unit and a second workpiece cutting unit included in the wire saw.

As to the tension control in the wire W between the workpiece cutting units 1A and 1B, there will be described with reference to the flow chart in FIG. 2.

Upon startup of the wire saw, the controller 50 first outputs a control signal to a motor control circuit (not shown) to cause the bobbins 13A and 13B of the respective wire feeder/winders 12A and 12B to be driven and to cause the guide rollers 10a and 10b of the workpiece cutting units 1A and 1B to be driven at a predetermined number of rotations (rotational speed) (steps S1 and S3).

When the rotational speed of the guide rollers 10a and 10b reaches a target value, the controller 50 determines, based on an output signal from the tension detector 18, whether tension (tension detected value) in the wire W between the workpiece cutting units 1A and 1B is a value within an acceptable range (acceptable value) set in advance or not (step S5), and, if making a determination of YES, the controller 50 make a transition to step S3.

On the other hand, in the case of a determination of NO in step S5, a further determination is made on whether the tension detected value is lower than an acceptable value (a minimum value within the acceptable range) or not (step S7). In the case of a determination of YES in step S7, the controller 50 outputs a control signal to the motor control circuit to cause the rotational speed of the guide rollers 10a and 10b of the workpiece cutting unit 1A (or 1B) that is positioned on a downstream side in the wire running direction to be increased by a predetermined speed increment (step S9). Specifically, in the first running condition of the wire W (refer to the solid line arrows in FIG. 1), the controller 50 causes the rotational speed of the guide rollers 10a and 10b of the second workpiece cutting unit 1B to be increased, while, in the second running condition of the wire W (refer to dashed line arrows in FIG. 1), the controller 50 causes the rotational speed of the guide rollers 10a and 10b of the first workpiece cutting unit 1A to be increased. Thus increasing the rotational speed of the guide rollers 10a and 10b of the workpiece cutting unit positioned on the downstream side among the workpiece cutting units 1A and 1B causes the wire W to be pulled toward the downstream side by the increment in the rotational speed, thereby increasing the tension in the wire W between the workpiece cutting units 1A and 1B.

In the present embodiment, the controller 50 controls one guide roller 10a of the guide rollers 10a and 10b of the workpiece cutting unit 1A (or 1B), as a main roller, in a rotational speed, while controlling the other guide roller 10b in a torque so as to prevent the wire groups from slack.

On the other hand, in the case of a determination of NO in step S7, that is, in the case of the tension detected value higher than an acceptable value (a maximum value within the acceptable range), the controller 50 outputs a control signal to the motor control circuit to cause the rotational speed of the guide rollers 10a and 10b of the workpiece cutting unit (the second workpiece cutting unit) positioned on a downstream side in the wire running direction among the workpiece cutting units 1A and 1B to be decreased by a predetermined speed decrement (step S11). Thus decreasing the rotational speed of the guide rollers 10a and 10b of the workpiece cutting unit positioned on the downstream side among the workpiece cutting units 1A and 1B provides the wire W with slack by the decrement in the rotational speed, thus decreasing the tension in the wire W between the workpiece cutting units 1A and 1B.

As described above, in the wire saw, the tension detector 18 detects the tension in the wire W between the workpiece cutting units 1A and 1B, and, when the detected value is not within an acceptable range, the tension in the wire W is controlled so as to fall within the range. Furthermore, the wire saw includes, as specific means thereof, adjusting (changing) the tension in the wire W by means of changing the rotational speed of the guide rollers 10a and 10b of the workpiece cutting units 1A and 1B, which can vary the tension in the wire W more promptly than a conventional wire saw, that is, a wire saw of a type of adjusting tension in a wire by means of driving a dedicated tension adjustment mechanism (dancer roller) while detecting the tension in the wire with a tension detector. In other words, in the wire saw according to the present embodiment, since the tension in the wire W is controlled by changing the rotational speed of the guide rollers 10a and 10b already being rotationally driven, only a small time tag is caused between detection of a fluctuation in tension by the tension detector and an actual change in the wire tension, compared to a wire saw in which a tension adjustment mechanism (dancer mechanism) is stopped in normal and is driven only upon fluctuation in tension as is the case of a conventional wire saw; thus a correction of the tension in the wire W is expedited.

The wire saw according to the present embodiment, therefore, makes it possible to more suitably keep the wire tension between the workpiece cutting units 1A and 1B within an acceptable value range, resulting in more reliable prevention of problems such as a break in the wire W.

The wire saw described above is just an example of a preferred embodiment of the wire saw according to the present invention; a specific configuration thereof is permitted to be modified as appropriate within the bounds of not departing from the spirit of the invention.

For example, while the rotational speed of the guide rollers (second guide rollers) 10a and 10b of the workpiece cutting unit on the downstream side in the wire running direction (the "second workpiece cutting unit" according to the present invention) among the workpiece cutting units 1A and 1B is changed in order to adjust the tension of the wire W between the workpiece cutting units 1A and 1B in the embodiment described above, changing the rotational speed of the guide rollers 10a and 10b of the workpiece cutting unit 1A (or 1B) on the upstream side of the wire running direction also establishes a similar operational effect.

Besides changing the rotational speed of the guide rollers 10a and 10b of one of the workpiece cutting units 1A and 1B as described above, may be changed the rotational speed of the guide rollers 10a and 10b of both workpiece cutting. For example, in the case of a great deviation of a tension detected value from the acceptable value, changing the rotational speeds of the guide rollers 10a and 10b of both of the workpiece cutting units 1A and 1B enables wire tension to be promptly adjusted. Accordingly, effective is a control of changing the rotational speed of the guide rollers 10a and 10b of one of the workpiece cutting units 1A and 1B in the case of a smaller deviation of a tension detected value from the acceptable value than a predetermined value, while changing the rotational speeds of the guide rollers 10a and 10b of both of the workpiece cutting units 1A and 1B in the case of the deviation equal to or greater than the predetermined value.

The controller 50 may be configured so as to compute such a correction value of the rotational speed of the guide rollers 10a and 10b as to make a deviation between a tension detected value by the tension detector 18 and an acceptable value set in advance be "0", when the tension detected value deviates from the acceptable value, and to change the rotational speed of the guide rollers 10a and 10b based on the correction value. In other words, there may be performed a feedback control in the rotational speed of the guide rollers 10a and 10b so that the tension detected value by the tension detector 18 falls within an acceptable value range set in advance. This control enables the wire W to be more reliably driven within the acceptable value range.

The present invention, which conceptually encompasses wire saws comprising at least a first workpiece cutting unit and a second workpiece cutting unit, also includes, for example, a wire saw comprising three or more workpiece cutting units. For example, there may be interposed a third workpiece cutting unit between the wire feeder and the first workpiece cutting unit or interposed between the second workpiece cutting unit and the wire winder.

The wire saw according to the present invention favorably comprises, in addition to the configuration described above, a tension fluctuation lessening mechanism. Specifically, changing the rotational speed of the guide rollers 10a and 10b of at least one of the workpiece cutting units 1A and 1B in order to adjust wire tension as described above immediately causes a fluctuation in a wire length between the workpiece cutting units 1A and 1B to cause temporary slack or excessive tension in the wire W, thus generating possibility of a tangle or a break in the wire W; however, such slack or excessive tension in the wire W can be avoided by providing a tension fluctuation lessening mechanism which lessens the fluctuation in wire tension.

Figure 3:
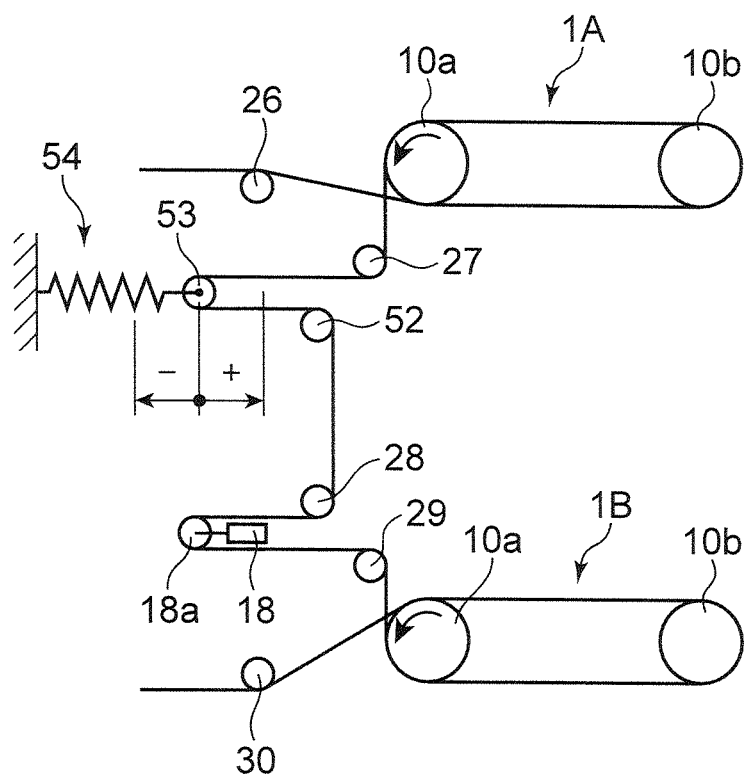
FIG. 3 is a schematic view showing an example of a tension fluctuation lessening mechanism that is introduced into the wire saw.

FIG. 3 schematically shows an example of a wire saw comprising the tension fluctuation lessening mechanism. The exemplified tension fluctuation lessening mechanism in FIG. 3 is provided between the workpiece cutting unit 1A and the tension detector 18, including a pulley 53 and an extension coil spring 54. The pulley 53 is arranged so as to be displaceable in a direction (in the drawing, a horizontal direction) perpendicular to an alignment direction of both workpiece cutting units 1A and 1B, and a wire W is passed around the pulley 53. The extension coil spring 54 connects the pulley 53 to a fixed wall or the like, having an elastic force which biases the pulley 53 horizontally (more specifically, in a direction in which the pulley 53 applies tension to the wire W). The wire W is sequentially passed around the guide pulley 27, the pulley 53 of the tension fluctuation lessening mechanism, the guide pulleys 52 and 28, the pulley 18a of the tension detector 18, and the guide pulley 29 in a descending order of proximity to the workpiece cutting unit 1A.

In this wire saw, upon an increase in a wire length between the workpiece cutting units 1A and 1B, the pulley 53 is pulled due to a spring force of the extension coil spring 54, being elastically displaced toward a side (−) shown in the drawing. This prevents the wire W from slack due to an increase in the wire length. Conversely, upon a reduction in the wire length between the workpiece cutting units 1A and 1B causes the pulley 53 to be displaced toward a side (+) in the drawing against the spring force of the extension coil spring 54. This prevents the wire W from excessive tension due to a decrease in the wire length. In short, the elastic displacement of the pulley 53 accompanying a fluctuation in the wire length between the workpiece cutting units 1A and 1B effectively lessens a fluctuation in wire tension due to the fluctuation in the wire length.

Figure 4A:
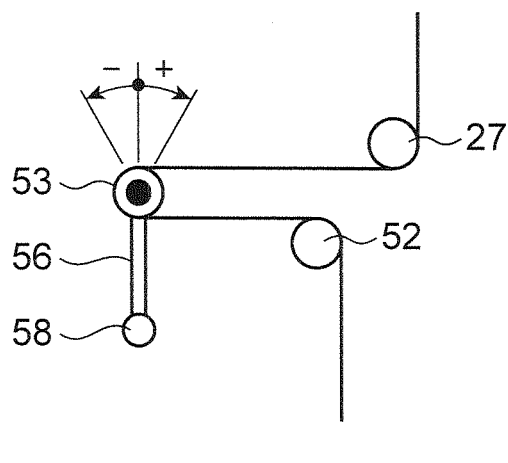
FIG. 4A is a front view showing an example of a tension fluctuation lessening mechanism other than the tension fluctuation lessening mechanism shown in FIG. 3.
Figure 4B:
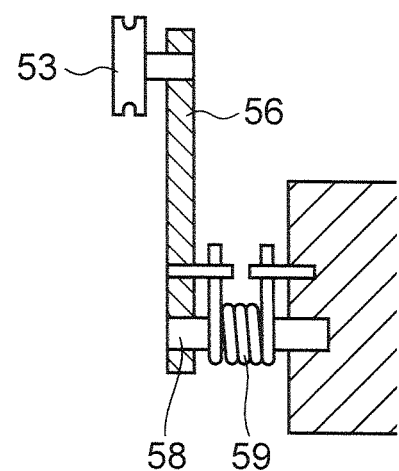
FIG. 4B is a sectional side view thereof.

A "biasing unit" of the tension fluctuation lessening mechanism is not limited to the extension coil spring 54 shown in FIG. 3. For example, as shown in FIGS. 4A and 4B, the biasing unit may include an arm 56 rotatably supported on a fixed wall or the like via a supporting shaft 58 parallel to rotational central axes of the respective guide pulleys and guide rollers, and a torsion coil spring 59 mounted to the supporting shaft 58 so as to apply a biasing force to the arm 56 in the direction of rotation thereof, the pulley 53 being rotatably supported by a rotatable end of the arm 56. In this mechanism, setting a direction in which the torsion coil spring 59 biases the arm 56 and the pulley 53 to a direction in which the pulley 53 applies tension to the wire W (a negative side direction in FIG. 4A) allows a similar operational effect to the example shown in FIG. 3 to be achieved.

As described above, the present invention provides a wire saw comprising a first workpiece cutting unit and a second workpiece cutting unit and being capable of adjusting tension in a cutting wire between both workpiece cutting units to an appropriate level with high responsiveness. The wire saw comprises: a wire feeder that feeds the cutting wire; a first workpiece cutting unit including a plurality of first guide rollers and a first drive unit that rotationally drives the first guide rollers, the cutting wire fed from the wire feeder being wound around each of the first guide rollers to form a workpiece-cutting wire group; a second workpiece cutting unit including a plurality of second guide rollers and a second drive unit that rotationally drives the second guide rollers, the cutting wire led out from the first workpiece cutting unit being wound around each of the second guide rollers to form a workpiece-cutting wire group; a wire winder that winds the cutting wire led out from the second workpiece cutting unit; a tension detector that detects tension in the cutting wire between the first workpiece cutting unit and the second workpiece cutting unit; and a control device that adjusts respective rotational speeds of the first guide rollers and the second guide rollers driven by the first drive unit and the second drive unit respectively. The control device changes the rotational speed of at least one of the first guide rollers and the second guide rollers so as to keep the tension detected by the tension detector within a predetermined range.

With this wire saw, the tension in the cutting wire that stretches from the first workpiece cutting unit to the second workpiece cutting unit is detected by the tension detector, and the rotational speed of at least one of the first guide rollers and the second guide rollers is changed so as to keep the detected tension within a predetermined range. In short, the tension in the cutting wire is promptly changed by adjusting a difference between the rotational speed of the first guide rollers and the rotational speed of the second guide rollers. Hence, a time lag is shortened compared to a case where a tension adjustment mechanism is activated after wire tension is detected as was conventional.

The control device preferably performs a feedback control of the rotational speed of the guide rollers based on a deviation between a tension detected value by the tension detector and an acceptable value set in advance.

In such a case, for example, the control device may change only the rotational speed of one of the first guide rollers and the second guide rollers when the deviation is smaller than a certain value while change the rotational speeds of both the first guide rollers and the second guide rollers when the deviation is equal to or greater than the certain value.

It is more favorable that the wire saw according to the present invention further comprises a tension fluctuation lessening mechanism that lessens a fluctuation in wire tension due to a fluctuation in a wire length of the cutting wire that stretches from the first workpiece cutting unit to the second workpiece cutting unit. While the above-mentioned change in the rotational speed of guide rollers may involve slack or excessive tension in the wire accompanying a fluctuation in the wire length of the cutting wire that stretches from the first workpiece cutting unit to the second workpiece cutting unit, providing a tension fluctuation lessening mechanism that lessens such a fluctuation in tension enables the slack or the excessive tension in the cutting wire due to an abrupt change in the tension to be avoided, thus preventing a tangle, a break, or the like in the cutting wire from being caused by the slack or the excessive tension.

As the tension fluctuation lessening mechanism, preferable is one which includes a pulley arranged between the first workpiece cutting unit and the second workpiece cutting unit, the cutting wire being wound the pulley, and a biasing unit elastically biasing the pulley in such a direction that the pulley applies tension to the cutting wire, the pulley making an elastic displacement accompanying a fluctuation in the wire length of the cutting wire that stretches from the first workpiece cutting unit to the second workpiece cutting unit, the elastic displacement lessening the fluctuation in the tension.

The invention claimed is:

1. A wire saw adapted to cut a workpiece using a cutting wire, the wire saw comprising:
   a wire feeder that feeds the cutting wire;
   a first workpiece cutting unit including a plurality of first guide rollers and a first drive unit that rotationally drives the first guide rollers, the cutting wire fed from the wire feeder being wound around each of the first guide rollers to form a workpiece-cutting wire group;
   a second workpiece cutting unit including a plurality of second guide rollers and a second drive unit that rotationally drives the second guide rollers, the cutting wire led out from the first workpiece cutting unit being wound around each of the second guide rollers to form a workpiece-cutting wire group;
   a wire winder that winds the cutting wire led out from the second workpiece cutting unit;
   a tension detector that detects tension in the cutting wire between the first workpiece cutting unit and the second workpiece cutting unit; and
   a control device that causes the first drive unit and the second drive unit to rotationally drive the first guide rollers and the second guide rollers, respectively, at a predetermined rotational speed, wherein the control device:
   performs a feedback control of the rotational speed of the guide rollers based on a deviation between a tension detected value by the tension detector and an acceptable value set in advance;
   changes only the rotational speed of one of the first guide rollers and the second guide rollers so as to keep tension detected by the tension detector within a predetermined range when the deviation is smaller than a certain value; and
   changes the rotational speeds of both the first guide rollers and the second guide rollers so as to keep the tension detected by the tension detector within the predetermined range when the deviation is equal to or greater than the certain value.

2. The wire saw according to claim 1, further comprising a tension fluctuation lessening mechanism that lessens a fluctuation in wire tension due to a fluctuation in a wire length of the cutting wire that stretches from the first workpiece cutting unit to the second workpiece cutting unit.

3. The wire saw according to claim 2, wherein the tension fluctuation lessening mechanism includes a pulley arranged between the first workpiece cutting unit and the second workpiece cutting unit, the cutting wire being passed around the pulley, and a biasing unit that elastically biases the pulley in a direction in which the pulley applies tension to the cutting wire, the pulley making an elastic displacement accompanying a fluctuation in a wire length of the cutting wire that stretches from the first workpiece cutting unit to the second workpiece cutting unit, the elastic displacement lessening a fluctuation in the wire tension.

* * * * *